(12) United States Patent
Yao

(10) Patent No.: US 11,718,334 B1
(45) Date of Patent: Aug. 8, 2023

(54) CART CONFIGURED TO CARRY VEHICLE DOORS AND VEHICLE ROOFS

(71) Applicant: SHENZHEN GLOBAL PURCHASE TRADING CO., LTD, Shenzhen (CN)

(72) Inventor: Jianmei Yao, Shenzhen (CN)

(73) Assignee: SHENZHEN GLOBAL PURCHASE TRADING CO., LTD, Shenzhen (CN)

( * ) Notice: Subject to any disclaimer, the term of this patent is extended or adjusted under 35 U.S.C. 154(b) by 0 days.

(21) Appl. No.: 18/106,580

(22) Filed: Feb. 7, 2023

(51) Int. Cl.
*B62B 3/02* (2006.01)
*B62B 3/10* (2006.01)
*B62B 3/00* (2006.01)

(52) U.S. Cl.
CPC ............ *B62B 3/108* (2013.01); *B62B 3/002* (2013.01); *B62B 3/02* (2013.01)

(58) Field of Classification Search
CPC ............ B62B 3/002; B62B 3/02; B62B 3/108
See application file for complete search history.

(56) References Cited

U.S. PATENT DOCUMENTS

| | | | | |
|---|---|---|---|---|
| 3,047,305 A | * | 7/1962 | Kleinschmidt | B62B 3/108 410/2 |
| 3,589,746 A | * | 6/1971 | Inglis | A47B 57/12 211/187 |
| 3,744,812 A | * | 7/1973 | Langhausen | B62B 3/108 280/47.12 |
| 3,782,746 A | * | 1/1974 | Isaacs | B62B 3/025 280/33.996 |
| 3,891,228 A | * | 6/1975 | Rhinehart | B62B 3/002 280/639 |
| 3,902,603 A | * | 9/1975 | Wilson | B62B 3/02 312/216 |
| 3,908,562 A | * | 9/1975 | Wittschen | B62B 3/02 108/177 |
| 4,066,022 A | * | 1/1978 | Graves | A47B 96/02 108/14 |
| 4,298,127 A | * | 11/1981 | Upshaw | B65D 21/06 211/126.9 |
| 5,120,072 A | * | 6/1992 | Laramie | B62B 3/009 280/47.17 |
| 5,199,729 A | * | 4/1993 | Sievert | B62B 3/02 248/240.4 |
| 5,713,584 A | * | 2/1998 | Crane | B62B 3/006 280/47.35 |
| 7,104,555 B1 | * | 9/2006 | Davis | B62B 3/02 280/47.28 |

(Continued)

*Primary Examiner* — Erez Gurari
(74) *Attorney, Agent, or Firm* — Daniel M. Cohn; Howard M. Cohn

(57) ABSTRACT

A cart configured to carry vehicle doors and vehicle roofs includes a bottom frame, a top frame, three front vertical rods, three rear vertical rods, a middle frame, three moving rods, two inner chassis, two side chassis, a rear chassis, and a plurality of universal wheels. The bottom frame includes a front bottom rod, a rear bottom rod, a left bottom rod, and a right bottom rod. The front bottom rod, the rear bottom rod, the left bottom rod, and the right bottom rod are connected end to end. Each two adjacent bottom rods of the bottom frame are detachably installed and connected through a first corner brace and first T-shaped screws. The top frame is arranged directly above the bottom frame. A shape and a size of the top frame are same as a shape and a size of the bottom frame.

8 Claims, 2 Drawing Sheets

(56) References Cited

U.S. PATENT DOCUMENTS

| | | | |
|---|---|---|---|
| 9,902,416 B1* | 2/2018 | Dockery | B62B 3/02 |
| 10,292,491 B1* | 5/2019 | Ke | A47F 5/137 |
| 10,717,454 B1* | 7/2020 | Alvarez | B62B 3/02 |
| 2003/0121874 A1* | 7/2003 | Koester | B62B 5/049 |
| | | | 211/187 |
| 2012/0091672 A1* | 4/2012 | Kaiser | B62B 3/16 |
| | | | 280/30 |
| 2012/0134771 A1* | 5/2012 | Larson | B65D 19/42 |
| | | | 414/800 |
| 2013/0200022 A1* | 8/2013 | Davis | B62B 3/02 |
| | | | 211/13.1 |
| 2013/0221630 A1* | 8/2013 | Tavolino | B62B 3/002 |
| | | | 280/79.2 |
| 2014/0035245 A1* | 2/2014 | De Jong | B65G 1/04 |
| | | | 280/79.3 |
| 2014/0091541 A1* | 4/2014 | Jarvi | B62B 3/002 |
| | | | 280/47.34 |
| 2014/0190077 A1* | 7/2014 | Burmann | B65D 19/06 |
| | | | 220/4.01 |
| 2018/0093796 A1* | 4/2018 | Raninen | B65D 19/44 |
| 2019/0071110 A1* | 3/2019 | Finstad | B62B 3/18 |
| 2020/0039553 A1* | 2/2020 | Abohammdan | B62B 5/061 |
| 2020/0223584 A1* | 7/2020 | Tripp | B65D 19/06 |
| 2020/0231197 A1* | 7/2020 | Liu | B62B 3/02 |
| 2020/0276997 A1* | 9/2020 | Dai | B62B 3/02 |
| 2021/0024111 A1* | 1/2021 | Chiao | B62B 3/02 |
| 2021/0031820 A1* | 2/2021 | Turner | B62B 3/004 |
| 2021/0101632 A1* | 4/2021 | Dolch | B62B 3/002 |
| 2021/0146981 A1* | 5/2021 | You | B62B 3/022 |
| 2021/0245790 A1* | 8/2021 | Finstad | B62B 3/004 |
| 2022/0055674 A1* | 2/2022 | McCormack | B62B 3/005 |
| 2022/0119023 A1* | 4/2022 | Go | B62B 3/02 |
| 2022/0135103 A1* | 5/2022 | Peterson | B62B 3/10 |
| | | | 280/47.34 |
| 2022/0212707 A1* | 7/2022 | Courtens | B25H 3/021 |
| 2023/0040174 A1* | 2/2023 | Visser | B62B 3/02 |
| 2023/0047812 A1* | 2/2023 | Eckhardt | B62B 5/049 |

* cited by examiner

CART CONFIGURED TO CARRY VEHICLE DOORS AND VEHICLE ROOFS

TECHNICAL FIELD

The present disclosure relates to a technical field of carts, and in particular to a cart configured to carry vehicle doors and vehicle roofs.

BACKGROUND

A cart (also known as a wheel barrow or a hand truck) is a manually pushed and pulled carrying vehicle that is the progenitor of all vehicles. Although material handling technology continues to evolve, the cart is still used as an indispensable handling tool. Because of characteristics of low cost, simple maintenance, easy operation, and light weight, the cart is widely used in production and life, is able to work in places where motor vehicles are not convenient to use, and is very convenient for carrying light items over short distances.

In a manufacturing process of vehicle doors and vehicles roofs, the cart is used to carry the vehicle doors and the vehicle roofs. In the prior art, the cart configured to carry the vehicle doors and the vehicle roofs is generally of a sheet metal welding structure, that is, a frame of the cart is formed by welding metal rods. A welded cart is not detachable, is large in size, takes up a lot of space, is very easy to squeeze and deform when transported, and is more troublesome to carry. Further, welded areas of the welded cart are slowly corroded due to oxidation, resulting in falling off of the metal rods and a short service life of the cart. Therefore, it is necessary to develop the cart configured to carry the vehicle doors and the vehicle roofs.

SUMMARY

In view of defects in the prior art, a purpose of the present disclosure is to provide a cart configured to carry vehicle doors and vehicle roofs, which effectively solves a problem that a conventional cart is not detachable, leading to large space occupation, inconvenient transportation, and short service life of the conventional cart.

To achieve the above purpose, the present disclosure provides a cart configured to carry vehicle doors and vehicle roofs. The cart configured to carry vehicle doors and vehicle roofs comprises a bottom frame, a top frame, three front vertical rods, three rear vertical rods, a middle frame, three moving rods, two inner chassis, two side chassis, a rear chassis, and a plurality of universal wheels.

The bottom frame comprises a front bottom rod, a rear bottom rod, a left bottom rod, and a right bottom rod. The front bottom rod, the rear bottom rod, the left bottom rod, and the right bottom rod are connected end to end. Each two adjacent bottom rods of the bottom frame are detachably installed and connected through a first corner brace and first T-shaped screws.

The top frame is arranged directly above the bottom frame. A shape and a size of the top frame are same as a shape and a size of the bottom frame. The top frame comprises a front top rod, a rear top rod, a left top rod, and a right top rod. The front top rod, the rear top rod, the left top rod, and the right top rod are connected end to end. Each two adjacent top rods of the top frame are detachably installed and connected through a second corner brace and second T-shaped screws.

The three front vertical rods are arranged on the bottom frame and the top frame at intervals from left to right. A lower end of each of the front vertical rods is detachably installed and connected to the bottom frame through third corner braces and third T-shaped screws. An upper end of each of the front vertical rods is detachably installed and connected to the top frame through fourth corner braces and fourth T-shaped screws.

The three rear vertical rods are arranged on the bottom frame and the top frame at intervals from left to right. The three rear vertical rods are arranged opposite to the three front vertical rods. A lower end of each of the rear vertical rods is detachably installed and connected to the bottom frame through fifth corner braces and fifth T-shaped screws. An upper end of each of the rear vertical rods is detachably installed and connected to the top frame through sixth corner braces and sixth T-shaped screws.

The middle frame is arranged between the bottom frame and the top frame. The middle frame comprises a rear middle rod and three longitudinal rods. The rear middle rod is detachably connected to the three rear vertical rods through seventh corner braces and seventh T-shaped screws. The three longitudinal rods are arranged at intervals from left to right. A front end of each of the longitudinal rods is detachably connected to a corresponding front vertical rod through an eighth corner brace and eighth T-shaped screws. A rear end of each of the longitudinal rods is detachably connected to a corresponding rear vertical rod through a ninth corner brace and ninth T-shaped screws.

The three moving rods are arranged at intervals from left to right. The three moving rods are arranged between the top frame and the middle frame. The three moving rods are movable up and down between the top frame and the middle frame. A front end of each of the moving rods is detachably connected to a corresponding front vertical rod through a tenth corner brace and tenth T-shaped screws. A rear end of each of the moving rods is detachably connected to a corresponding rear vertical rod through an eleventh corner brace and eleventh T-shaped screws.

The two inner chassis are arranged from left to right. A front end of each of the inner chassis is installed and connected to the front bottom rod through first screws, and a rear end of each of the inner chassis is connected to the rear bottom rod through second screws.

The two side chassis are respectively arranged on a left outer side of and the bottom frame and a right outer sides of the bottom frame. The two side chassis are respectively arranged on a left outer side of the middle frame and a right outer sides of the middle frame. Lower sides of the two side chassis are respectively connected to the left bottom rod and the right bottom rod by third screws; An upper side of each of the side chassis is connected to a corresponding longitudinal rod by fourth screws.

The rear chassis is arranged on a rear side of the bottom frame and a rear side of the middle frame. A lower side of the rear chassis is installed and connected to the rear bottom rod through fifth screws, and an upper side of the rear chassis is connected to the rear middle rod through sixth screws.

The plurality of universal wheels are respectively mounted at corners of a bottom portion of the bottom frame through seventh screws.

Optionally, first clasps are detachably arranged on outer sides of two of the three moving rods arranged on two sides of the cart. Each of the first clasps is arranged above a corresponding side chassis.

Optionally, a second clasp is detachably arranged on one of the three rear vertical rods arranged on a middle portion of the cart. The second clasp is arranged above the rear chassis.

Optionally, a top end of each of the front vertical rods and a top end of each of the rear vertical rods are covered with a respective plastic cover.

Optionally, handles are respectively detachably installed on one of the three front vertical rods arranged on a left side of the cart and one of the three rear vertical rods arranged on the left side of the cart.

Optionally, the two inner chassis, the two side chassis, and the rear chassis are coved with ethylene vinyl acetate (EVA). The EVA has a thickness of 2 mm.

Optionally, anti-collision tapes are respectively arranged on the front bottom rod, the rear bottom rod, the three front vertical rods, the three rear vertical rods, and the three moving rods.

Optionally, four universal wheels are provided. Two of the four universal wheels are locking universal wheels.

Compared with the prior art, in the present disclosure, by arrangement of corner braces and T-shaped screws, each rod is detachably installed. Further, chassis and the universal wheels are detachably installed through the screws, so the cart of the present disclosure is able to be assembled without welding, is able to be disassembled according to the need, has a small volume after disassembly, occupies little space, is easy to transport and carry, and saves transportation costs. An overall structure of the cart of the present disclosure is stable and has a long service life.

Figure 1:
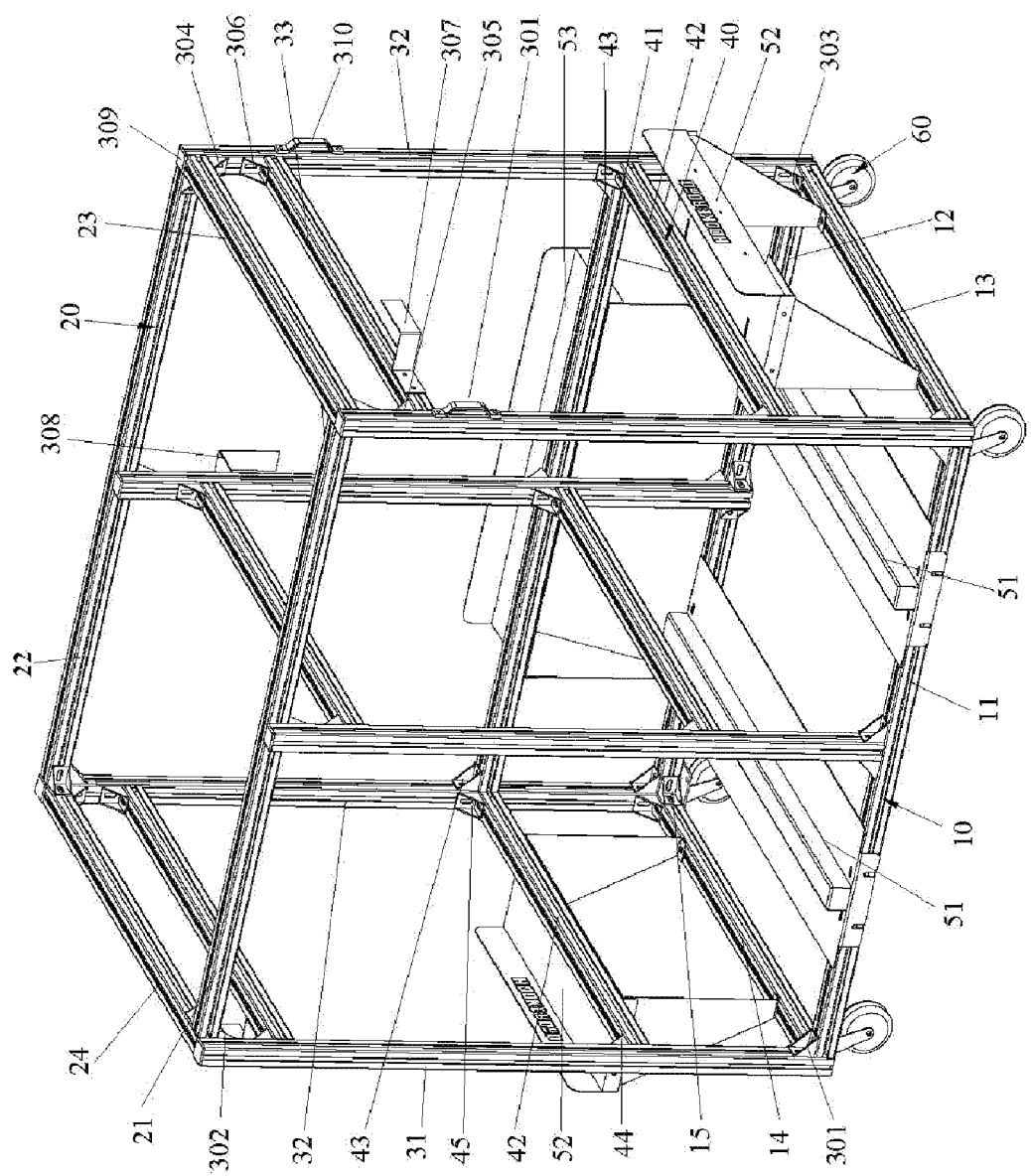
FIG. 1 is a perspective schematic diagram of a cart according to one embodiment of the present disclosure.

In the drawings:
10—bottom frame; 11—front bottom rod; 12—rear bottom rod; 13—left bottom rod; 14—right bottom rod; 15—first corner brace; 20—top frame; 21—front top rod; 22—rear top rod; 23—left top rod; 24—right top rod; 25—second corner brace; 31—front vertical rod; 32—and rear vertical rod; 33: moving rod; 301—third corner brace; 302: fourth corner brace; 303: fifth corner brace; 304: sixth corner brace; 305: tenth corner brace; 306: eleventh corner brace; 307—first clasp; 308—second clasp; 309—plastic cover. 310—handle 40—middle frame; 41—rear middle rod; 42—vertical rod; 43: seventh corner brace; 44—eighth brace; 45: ninth corner brace; 51—inner chassis; 52—side chassis; 53—rear chassis; 60—universal wheel.

DETAILED DESCRIPTION

Figure 2:
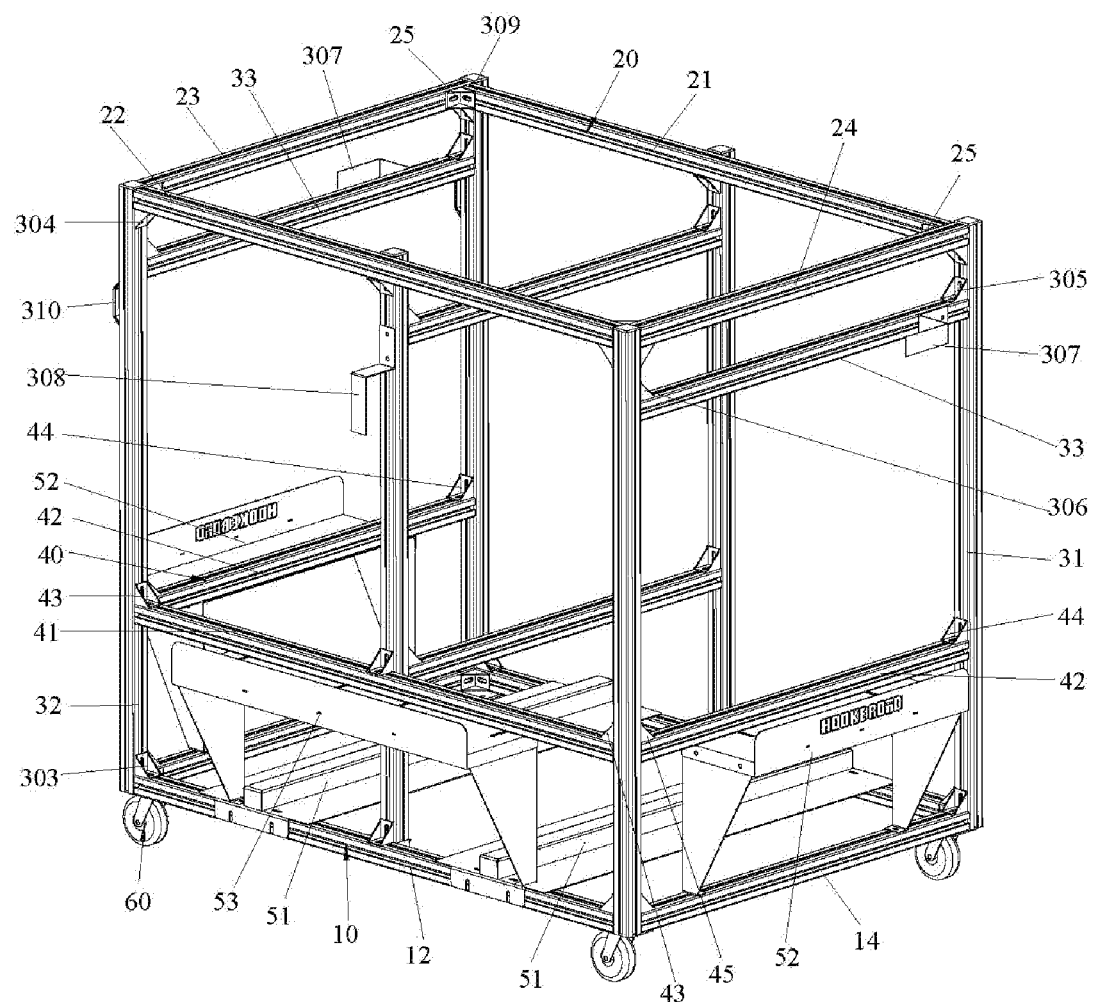
FIG. 2 is another perspective schematic diagram of the cart according to one embodiment of the present disclosure.

As shown in FIGS. 1 and 2, which show s specific structure of a cart configured to carry vehicle doors and vehicle roofs according to one optional embodiment of the present disclosure.

The cart configured to carry vehicle doors and vehicle roofs comprises a bottom frame 10, a top frame 20, three front vertical rods 31, three rear vertical rods 32, a middle frame 40, three moving rods 33, two inner chassis 51, two side chassis 52, a rear chassis 53, and a plurality of universal wheels 60.

The bottom frame 10 comprises a front bottom rod 11, a rear bottom rod 12, a left bottom rod 13, and a right bottom rod 14. The front bottom rod 11, the rear bottom rod 12, the left bottom rod 13, and the right bottom rod 14 are connected end to end. Each two adjacent bottom rods of the bottom frame 10 are detachably installed and connected through a first corner brace 15 and first T-shaped screws (not shown in the drawings). The front bottom rod 11, the rear bottom rod 12, the left bottom rod 13, and the right bottom rod 14 are aluminum structures.

The top frame 20 is arranged directly above the bottom frame 10. A shape and a size of the top frame 20 are same as a shape and a size of the bottom frame 10. The top frame 20 comprises a front top rod 21, a rear top rod 22, a left top rod 23, and a right top rod 24. The front top rod 21, the rear top rod 22, the left top rod 23, and the right top rod 24 are connected end to end. Each two adjacent top rods of the top frame 20 are detachably installed and connected through a second corner brace 25 and second T-shaped screws (not shown in the drawings). The front top rod 21, the rear top rod 22, the left top rod 23, and the right top rod 24 are aluminum structures.

The three front vertical rods 31 are arranged on the bottom frame 10 and the top frame 20 at intervals from left to right. A lower end of each of the front vertical rods 31 is detachably installed and connected to the bottom frame 10 through third corner braces 301 and third T-shaped screws (not shown in the drawings). An upper end of each of the front vertical rods 31 is detachably installed and connected to the top frame 10 through fourth corner braces 302 and fourth T-shaped screws (not shown in the drawings).

The three rear vertical rods 32 are arranged on the bottom frame 10 and the top frame 20 at intervals from left to right. The three rear vertical rods 32 are arranged opposite to the three front vertical rods31. A lower end of each of the rear vertical rods 32 is detachably installed and connected to the bottom frame 10 through fifth corner braces 303 and fifth T-shaped screws (not shown in the drawings). An upper end of each of the rear vertical rods 32 is detachably installed and connected to the top frame 20 through sixth corner braces 304 and sixth T-shaped screws (not shown in the drawings). In the embodiment, a second clasp 308 is detachably arranged on one of the three rear vertical rods 32 arranged on a middle portion of the cart. The second clasp 308 is arranged above a rear chassis 53. The second clasp is configured to clasp and position the vehicle doors. Furthermore, a top end of each of the front vertical rods 31 and a top end of each of the rear vertical rods 32 are covered with a respective plastic cover 309. If a vehicle roof are placed on the top end of each of the front vertical rods 31 and the top end of each of the rear vertical rods 32, since the front vertical rods 31 and the three rear vertical rods 32 are aluminum structures, the front vertical rods 31 and the three rear vertical rods may scrape the vehicle roof. By arrangements of each plastic cover 309, the vehicle roof placed thereon is prevented from scraping, which further protects the vehicle roof.

In addition, handles 310 are respectively detachably installed on one of the three front vertical rods 31 arranged on a left side of the cart and one of the three rear vertical rods 32 arranged on the left side of the cart. The handles are configured to push the cart. The front vertical rods 31 and the three rear vertical rods 32 are aluminum structures.

The middle frame 40 is arranged between the bottom frame 10 and the top frame 20. The middle frame 40 comprises a rear middle rod 41 and three longitudinal rods 42. The rear middle rod 41 is detachably connected to the three rear vertical rods 32 through seventh corner braces 43 and seventh T-shaped screws (not shown in the drawings). The three longitudinal rods 42 are arranged at intervals from left to right. A front end of each of the longitudinal rods 42 is detachably connected to a corresponding front vertical rod 31 through an eighth corner brace 44 and eighth T-shaped screws (not shown in the drawings). A rear end of each of the longitudinal rods 42 is detachably connected to a corresponding rear vertical rod 32 through a ninth corner brace 45 and ninth T-shaped screws (not shown in the drawings). The rear middle rod 41 and three longitudinal rods 42 are aluminum structures.

The three moving rods 33 are arranged at intervals from left to right. The three moving rods 33 are arranged between the top frame 20 and the middle frame 40. The three moving rods 33 are movable up and down between the top frame 20 and the middle frame 40. A front end of each of the moving rods 33 is detachably connected to a corresponding front vertical rod 31 through a tenth corner brace 305 and tenth T-shaped screws (not shown in the drawings). A rear end of each of the moving rods 33 is detachably connected to a corresponding rear vertical rod 32 through an eleventh corner brace 306 and eleventh T-shaped screws (not shown in the drawings). The moving rods are moved up or down according to a size of a vehicle door. In the embodiment, first clasps 307 are detachably arranged on outer sides of two of the three moving rods 33 arranged on two sides of the cart. Each of the first clasps 307 is arranged above a corresponding side chassis. The first clasps are configured to clasp and position the vehicle door. In addition, anti-collision tapes are respectively arranged on the front bottom rod 11, the rear bottom rod 12, the three front vertical rods 31, the three rear vertical rods 32, and the three moving rods 33. The anti-collision tapes is configured to prevent the vehicle door from scraping when placing the vehicle door. The three moving rods 33 are aluminum structures.

The two inner chassis 51 are arranged from left to right. A front end of each of the inner chassis 51 is installed and connected to the front bottom rod 11 through first screws (not shown in the drawings), and a rear end of each of the inner chassis 51 is connected to the rear bottom rod 12 through second screws (not shown in the drawings).

The two side chassis 52 are respectively arranged on a left outer side of the bottom frame and a right outer sides of the bottom frame. The two side chassis 52 are respectively arranged on a left outer side of the middle frame 40 and a right outer sides of the middle frame 40. Lower sides of the two side chassis 52 are respectively connected to the left bottom rod 13 and the right bottom rod 14 by third screws (not shown in the drawings). An upper side of each of the side chassis 52 is connected to a corresponding longitudinal rod 42 by fourth screws (not shown in the drawings).

The rear chassis 53 is arranged on a rear side of the bottom frame 10 and a rear side of the middle frame 40. A lower side of the rear chassis 53 is installed and connected to the rear bottom rod 12 through fifth screws (not shown in the drawings). An upper side of the rear chassis 53 is connected to the rear middle rod 41 through sixth screw (not shown in the drawings). In the embodiment, the two inner chassis 51, the two side chassis 52, and the rear chassis 53 are coved with ethylene vinyl acetate (EVA) to prevent the vehicle door from scraping. The EVA (not shown in the drawings) has a thickness of 2 mm. The two inner chassis 51, the two side chassis 52, and the rear chassis 53 are metal housing structures.

The plurality of universal wheels 60 are respectively mounted at corners of a bottom portion of the bottom frame 10 through seventh screws (not shown in the drawings). In the embodiment, four universal wheels 60 are provided; two of the four universal wheels 60 are locking universal wheels.

A working principle of the present disclosure is as follow.

When assembling, the bottom frame 10, the top frame 20, the three front vertical rods 31, the three rear vertical rods 32, the middle frame 40, and the three moving rods 33 are assembled together with corresponding corner braces and corresponding T-shaped screws. The plurality of universal wheels 60 are assembled on the bottom portion of the bottom frame 10 by the screws. The two inner chassis 51, the two side chassis 52 and the rear chassis 53 are assembled at corresponding positions of the cart by screws. Thus, the cart is assembled without welding and is detachable, which effectively saves a transportation space and costs.

When in use, the vehicle door is placed on the inner chassis 51, the two side chassis 52 or the rear chassis 53, and the vehicle door is positioned against corresponding rods. The vehicle roof is placed on the top frame 20, and then the cart is manually pushed to move or carry the vehicle door and the vehicle roof.

In the present disclosure, by arrangement of corner braces and T-shaped screws, each rod is detachably installed. Further, chassis and the universal wheels are detachably installed through the screws, so the cart of the present disclosure is able to be assembled without welding, is able to be disassembled according to the need, has a small volume after disassembly, occupies little space, is easy to transport and carry, and saves transportation costs. An overall structure of the cart of the present disclosure is stable and has a long service life.

The above are only optional embodiments of the present disclosure and specifically depict technical principles of the present disclosure. These descriptions are only for explaining the principles of the present disclosure, and cannot be interpreted as limiting of the protection scope of the present disclosure in any way. Based on the explanations, other specific implementations of the present disclosure obtained by those skilled in the art without creative work should fall within the protection scope of the present disclosure.

What is claimed is:

1. A cart configured to carry vehicle doors and vehicle roofs, comprising: a bottom frame, a top frame, three front vertical rods, three rear vertical rods, a middle frame, three moving rods, two inner chassis, two side chassis, a rear chassis, and a plurality of universal wheels;
   wherein the bottom frame comprises a front bottom rod, a rear bottom rod, a left bottom rod, and a right bottom rod; the front bottom rod, the rear bottom rod, the left bottom rod, and the right bottom rod are connected end to end; and each two adjacent bottom rods of the bottom frame are detachably installed and connected through a first corner brace and first T-shaped screws;
   wherein the top frame is arranged directly above the bottom frame; a shape and a size of the top frame are same as a shape and a size of the bottom frame; the top frame comprises a front top rod, a rear top rod, a left top rod, and a right top rod; the front top rod, the rear top rod, the left top rod, and the right top rod are connected end to end; and each two adjacent top rods of the top frame are detachably installed and connected through a second corner brace and second T-shaped screws;
   wherein the three front vertical rods are arranged on the bottom frame and the top frame at intervals from left to right; a lower end of each of the front vertical rods is detachably installed and connected to the bottom frame through third corner braces and third T-shaped screws; an upper end of each of the front vertical rods is detachably installed and connected to the top frame through fourth corner braces and fourth T-shaped screws;

wherein the three rear vertical rods are arranged on the bottom frame and the top frame at intervals from left to right; the three rear vertical rods are arranged opposite to the three front vertical rods; a lower end of each of the rear vertical rods is detachably installed and connected to the bottom frame through fifth corner braces and fifth T-shaped screws; an upper end of each of the rear vertical rods is detachably installed and connected to the top frame through sixth corner braces and sixth T-shaped screws;

wherein the middle frame is arranged between the bottom frame and the top frame; the middle frame comprises a rear middle rod and three longitudinal rods; the rear middle rod is detachably connected to the three rear vertical rods through seventh corner braces and seventh T-shaped screws; the three longitudinal rods are arranged at intervals from left to right; a front end of each of the longitudinal rods is detachably connected to a corresponding front vertical rod through an eighth corner brace and eighth T-shaped screws; a rear end of each of the longitudinal rods is detachably connected to a corresponding rear vertical rod through a ninth corner brace and ninth T-shaped screws;

wherein the three moving rods are arranged at intervals from left to right; the three moving rods are arranged between the top frame and the middle frame; the three moving rods are movable up and down between the top frame and the middle frame; a front end of each of the moving rods is detachably connected to a corresponding front vertical rod through a tenth corner brace and tenth T-shaped screws; a rear end of each of the moving rods is detachably connected to a corresponding rear vertical rod through an eleventh corner brace and eleventh T-shaped screws;

wherein the two inner chassis are arranged from left to right; a front end of each of the inner chassis is installed and connected to the front bottom rod through first screws, and a rear end of each of the inner chassis is connected to the rear bottom rod through second screws;

wherein the two side chassis are respectively arranged on a left outer side of the bottom frame and a right outer sides of the bottom frame; the two side chassis are respectively arranged on a left outer side of the middle frame and a right outer sides of the middle frame; lower sides of the two side chassis are respectively connected to the left bottom rod and the right bottom rod by third screws; an upper side of each of the side chassis is connected to a corresponding longitudinal rod by fourth screws;

wherein the rear chassis is arranged on a rear side of the bottom frame and a rear side of the middle frame; a lower side of the rear chassis is installed and connected to the rear bottom rod through fifth screws, and an upper side of the rear chassis is connected to the rear middle rod through sixth screws;

wherein the plurality of universal wheels are respectively mounted at corners of a bottom portion of the bottom frame through seventh screws.

2. The cart configured to carry vehicle doors and vehicle roofs according to claim 1, wherein first clasps are detachably arranged on outer sides of two of the three moving rods arranged on two sides of the cart; each of the first clasps is arranged above a corresponding side chassis.

3. The cart configured to carry vehicle doors and vehicle roofs according to claim 1, wherein a second clasp is detachably arranged on one of the three rear vertical rods arranged on a middle portion of the cart; the second clasp is arranged above the rear chassis.

4. The cart configured to carry vehicle doors and vehicle roofs according to claim 1, wherein a top end of each of the front vertical rods and a top end of each of the rear vertical rods are covered with a respective plastic cover.

5. The cart configured to carry vehicle doors and vehicle roofs according to claim 1, wherein handles are respectively detachably installed on one of the three front vertical rods arranged on a left side of the cart and one of the three rear vertical rods arranged on the left side of the cart.

6. The cart configured to carry vehicle doors and vehicle roofs according to claim 1, wherein the two inner chassis, the two side chassis, and the rear chassis are coved with ethylene vinyl acetate (EVA); the EVA has a thickness of 2 mm.

7. The cart configured to carry vehicle doors and vehicle roofs according to claim 1, wherein anti-collision tapes are respectively arranged on the front bottom rod, the rear bottom rod, the three front vertical rods, the three rear vertical rods, and the three moving rods.

8. The cart configured to carry vehicle doors and vehicle roofs according to claim 1, wherein four universal wheels are provided; two of the four universal wheels are locking universal wheels.

\* \* \* \* \*